US006996976B2

(12) United States Patent
Rumminger et al.

(10) Patent No.: US 6,996,976 B2
(45) Date of Patent: Feb. 14, 2006

(54) APPARATUS AND METHOD FOR MOUNTING A DEVICE TO A PIPE

(75) Inventors: Marc D. Rumminger, Berkeley, CA (US); Michael Streichsbier, El Cerrito, CA (US); Dean B. Wehrley, Carlsbad, CA (US); Richard G. Lemke, San Diego, CA (US)

(73) Assignee: Cleaire Advanced Emmision Controls, San Leandro, CA (US)

( * ) Notice: Subject to any disclaimer, the term of this patent is extended or adjusted under 35 U.S.C. 154(b) by 156 days.

(21) Appl. No.: 10/407,139

(22) Filed: Apr. 3, 2003

(65) Prior Publication Data

US 2003/0226412 A1    Dec. 11, 2003

Related U.S. Application Data

(60) Provisional application No. 60/369,911, filed on Apr. 3, 2002.

(51) Int. Cl.
*F01N 3/00*    (2006.01)

(52) U.S. Cl. ............................ 60/295; 60/272; 60/322; 204/421; 204/423; 204/426; 204/429

(58) Field of Classification Search ................. 60/272, 60/276, 295, 322; 204/421, 422, 423, 424, 204/425, 426, 427, 428, 429; 123/470
See application file for complete search history.

(56) References Cited

U.S. PATENT DOCUMENTS

| | | | |
|---|---|---|---|
| 3,444,740 A | 5/1969 | Davis | 73/359 |
| 4,040,930 A * | 8/1977 | Dillon | 204/429 |
| 4,175,019 A * | 11/1979 | Murphy | 204/429 |
| 4,184,934 A * | 1/1980 | Bode et al. | 204/428 |
| 4,353,260 A * | 10/1982 | Round | 73/863.41 |
| 4,364,226 A | 12/1982 | Croset et al. | 60/276 |
| 4,597,850 A * | 7/1986 | Takahasi et al. | 204/426 |
| 4,655,035 A | 4/1987 | Sager, Jr. | 60/307 |
| 4,746,223 A | 5/1988 | Miyata et al. | 374/103 |
| 5,522,218 A | 6/1996 | Lane et al. | 60/274 |
| 5,605,042 A | 2/1997 | Stutzenberger | 60/286 |
| 5,832,723 A * | 11/1998 | Iwata et al. | 60/276 |
| 6,050,088 A | 4/2000 | Brenner | 60/303 |
| 6,279,603 B1 | 8/2001 | Czarnik et al. | 137/339 |
| 6,319,376 B1 * | 11/2001 | Graser et al. | 204/424 |
| 6,340,059 B1 * | 1/2002 | Bethea | 169/37 |
| 6,513,323 B1 * | 2/2003 | Weigl et al. | 60/286 |

OTHER PUBLICATIONS

U.S. Appl. No. 10/407,140 (reference available on request).

* cited by examiner

*Primary Examiner*—Binh Q. Tran
(74) *Attorney, Agent, or Firm*—Heller Ehrman LLP

(57) ABSTRACT

An apparatus and method for mounting a device to a pipe. The apparatus is particularly useful for the installation and/or replacement of retrofit sensors and injectors to the piping of engine exhaust systems and emission control systems, and is designed to be used on pipes of different dimensions.

2 Claims, 8 Drawing Sheets

APPARATUS AND METHOD FOR MOUNTING A DEVICE TO A PIPE

CROSS-REFERENCE TO RELATED APPLICATION

This application claims the priority under 35 USC 119(e) of Provisional Application No. 60/369,911, filed Apr. 3, 2002, which is incorporated into this application by reference.

BACKGROUND OF THE INVENTION

1. Field of the Invention

This invention relates to an apparatus and method for mounting a device to a pipe.

2. Description of Related Art

Batch or continuous manufacturing and production processes in the chemical, food and other manufacturing industries employing a system of pipes for the conveyance of fluid materials often require mounting a variety of different devices, such as injectors and sensors, to the pipes of the system. Injectors are usually provided to introduce reagents, while sensors may measure such conditions as temperature, flow rate, or concentration of a reagent or product.

Exhaust purification systems for an internal combustion engines frequently contain injectors for the addition of reagents used in the exhaust purification process and sensors for measuring the concentration of various exhaust components. These systems frequently requires the installation or replacement of new injectors and sensors for optimizing the efficiency of the systems. For original equipment manufacturers, the installation of new injectors or sensors is usually performed at the engine manufacturing site, where the assembly and installation of equipment is not dictated by manufacturing method restrictions or by space or equipment constraints. However, for aftermarket modifications of internal combustion engine-powered systems (e.g., trucks, buses, cranes, welders), the installation of new injectors or sensors onto existing equipment or the replacement of already-installed injectors or sensors must often be performed at remote repair or retrofit facilities.

The current practice for the installation of injectors and sensors to metallic pipes is to drill a hole in the pipe, weld a fitting onto the pipe, and finally attach the injector or sensor to the fitting. For fixed engine exhaust systems, welding a fitting onto the exhaust pipe is particularly difficult because it may not be feasible to bring welding equipment to the site of the fixed engine. For vehicle-mounted exhaust systems, many repair facilities do not have access to welding equipment.

In addition, the welding of a fitting onto a pipe of an existing system may not be feasible because of difficulty of access to the pipe for lack of space. Frequently in vehicle exhaust systems there is only about 2–5 cm clearance between the exhaust pipe(s) and other parts of the vehicle or other equipment mounted to the vehicle. Also, welding a fitting onto the exhaust system of a vehicle may damage the engine or vehicle electronics, for example, by charge transfer processes.

Most exhaust systems for internal combustion engines include catalytic converters that are used in conjunction with various gas or fuel injectors and sensors for optimizing the operational efficiency of the catalytic converters. Frequently, lean oxides of nitrogen ($NO_x$) catalysts, selective catalyst reduction (SCR) systems, and particulate filter systems employed for retrofit applications require the installation of an additional reagent injector and sensor. Injectors and sensors that are already installed in automobiles have special mounting structures that are attached or pre-formed into the exhaust pipe during manufacture. However, such manufacturing and mounting procedures are not usable for small-scale aftermarket retrofits.

Various apparatus for mounting injectors or sensors onto an exhaust system are known in the art.

U.S. Pat. No. 3,444,740 discloses an apparatus for measuring temperature where a wrap-around clamp secures a temperature measurement device in intimate contact with a pipe.

U.S. Pat. No. 4,364,226 discloses a device for inserting a sensor into an exhaust conduit of an internal combustion engine where the support of the sensor is formed by the sealing element of the assembly gaskets of the exhaust conduit.

U.S. Pat. No. 4,655,035 discloses an auxiliary air injector assembly for an exhaust pipe, with an injector fitting that is held in place in a hole in the pipe by the end of an air flow tube that is clamped against it by a saddle clamp extending around the pipe.

U.S. Pat. No. 4,746,223 discloses a meter for integrating the operating time of a steam trap, where a clamp is used to hold an electrolytic cell acting as a temperature sensor in close proximity to a pipe.

U.S. Pat. Nos. 5,522,218 and 5,605,042 disclose a combustion exhaust purification systems which includes injectors for injecting a $NO_x$ reducing fluid into an exhaust; however, no details of the installation of the injectors are described.

U.S. Pat. No. 6,050,088 discloses a mixture delivery device for introducing a reducing agent into an exhaust system containing an annular spray body inside the exhaust system. The patent illustrates this delivery device as being welded into an exhaust system.

U.S. Pat. No. 6,279,603 discloses an injector for a reducing reagent to improve the operation of a reducing catalytic converter, where the injector is mounted (e.g. by screw threading) to a sleeve welded to the exhaust pipe.

These and other documents cited in this application are incorporated into this application by reference.

SUMMARY OF THE INVENTION

In a first aspect, this invention is an apparatus for mounting a device to a pipe, the pipe having a curved wall having an outer surface and a hole through the pipe wall at a position in the pipe wall, the apparatus comprising:

(a) a gasket conformable to the outer surface of the pipe wall adjacent the pipe wall hole, and having a gasket hole complementary to the pipe wall hole, (b) a mounting block, having at least a part of one surface conformed to the outer surface of the pipe wall adjacent the pipe wall hole, having integral therewith on that at least a part of the one surface a projection shaped to engage the pipe wall hole such that the mounting block can be placed on the pipe over the gasket with the projection engaging the pipe wall hole, and having an aperture extending through the mounting block and projection, the end of the aperture furthest from the projection being adapted to receive the device, such that, when the device is received onto the mounting block and the mounting block is placed on the pipe over the gasket with the projection engaging the hole in the pipe wall, there is a continuous open passage between the interior of the pipe and the device; and (c) a fastener for securing the mounting block onto the pipe over the gasket such that the projection engages the pipe wall hole.

In a second aspect, this invention is a method for mounting a device to a pipe, the pipe having a curved wall having an outer surface, the method comprising:

(a) cutting a hole in the pipe wall;
(b) fastening the apparatus of claim 1 to the pipe; and
(c) receiving the device onto the end of the aperture furthest from the projection.

The invention is particularly useful for the installation and/or replacement of retrofit sensors and injectors to the piping of engine exhaust systems and emission control systems, and is designed to be used on pipes of different dimensions.

The invention is particularly applicable for the installation of a fuel-cooled injector of the type mounted in the apparatus described in U.S. application Ser. No. 10/407,140, filed concurrently herewith and claiming the benefit of Provisional Application No. 60/369,955. Ser. No. 10/407,140 and the corresponding provisional application are incorporated into this application by reference.

DETAILED DESCRIPTION OF THE INVENTION

Articles such as "a", "an", and "the" include the plural as well as the singular.

"Pipe" has the common dictionary meaning of a hollow cylinder, and includes "tube", "duct" and similar terms. No particular cross-section is implied by the term, but commonly a pipe is of circular cross-section, and the following discussion will refer to such pipes. It will be evident from the following discussion that pipes of non-circular cross-section, for example oval cross-section, can also have devices mounted thereon by the apparatus and method of this invention.

Pipes on which the apparatus of this invention may be used may have, for example, a diameter, of about 6–120 cm, typically about 6–20 cm. The apparatus is particularly useful for mounting devices to thin-walled pipes, such as pipes having a wall thickness less than about 6 mm, for example, having a wall thickness of 0.5–2 mm. It is therefore particularly suitable for mounting devices to such pipes as the exhaust pipes of internal combustion engines, such as the diesel engines of buses, trucks, and the like, to enable monitoring of the exhaust gas (e.g., when the device is a sensor) or treatment of the exhaust gas (e.g., when the device is an injector for a $NO_x$ reducing fluid).

The invention provides an apparatus and method for mounting a device, particularly an injector or a sensor, onto a pipe, to provide and maintain a leak-tight seal that is capable of withstanding high temperatures (e.g., 100–900° C.). "Mounting a device on a pipe" means that the device, when received in the apparatus and the apparatus mounted on the pipe, is in fluid communication with the interior of the pipe through a continuous open passage through the apparatus between the interior of the pipe and the device. The apparatus is capable of withstanding multiple heating and cooling cycles, occupies minimal space, and is capable of being economically manufactured for a variety of applications. The apparatus is usable for mounting design of the present invention is adaptable for mounting devices of various shapes and sizes, provided only that they are receivable on the mounting block of the apparatus.

Figure 1:
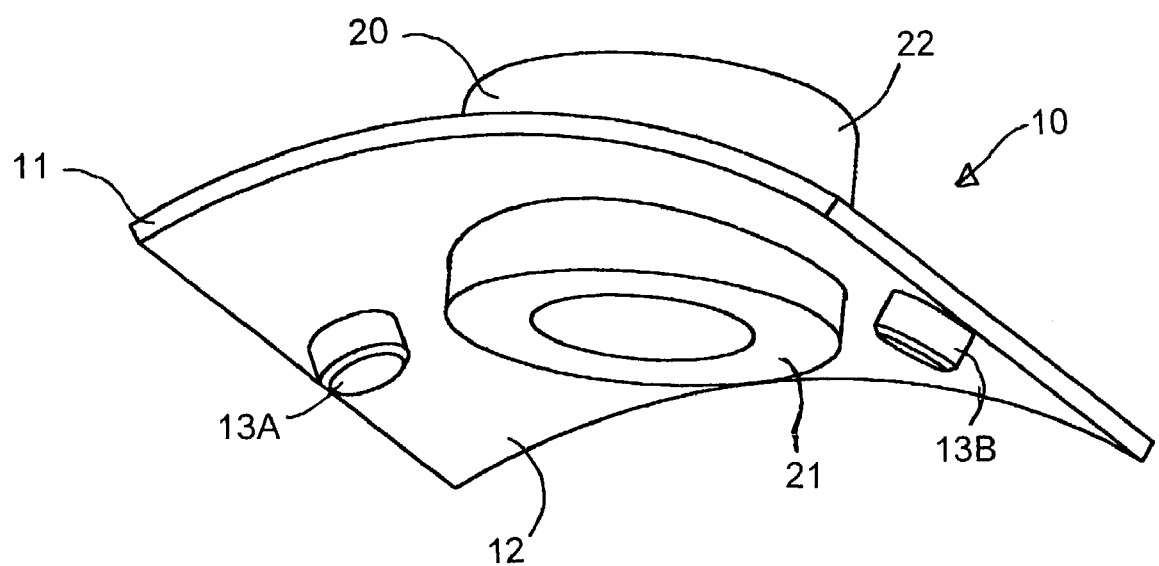
FIG. 1 is a perspective view from below of a mounting block of this invention.

FIG. 1 is a perspective view from below of a mounting block of the apparatus. The mounting block shown generally at 10 here comprises a plate 11 having a lower surface 12 (the surface being conformed to the outer surface of the pipe where the apparatus is to be mounted) and two locating pegs 13A and 13B projecting downwardly therefrom. Centrally on the plate 11 and projecting above and below it is a tube 20, having a lower part 21 projecting below the lower surface 12 of plate 11 and an upper part 22 projecting above the upper surface of plate 11.

The locating pegs shown in this Figure are not required by the invention, but it is advantageous for the mounting block to have at least one locating peg, as this provides positive and secure placement of the mounting block on the pipe.

Figure 2:
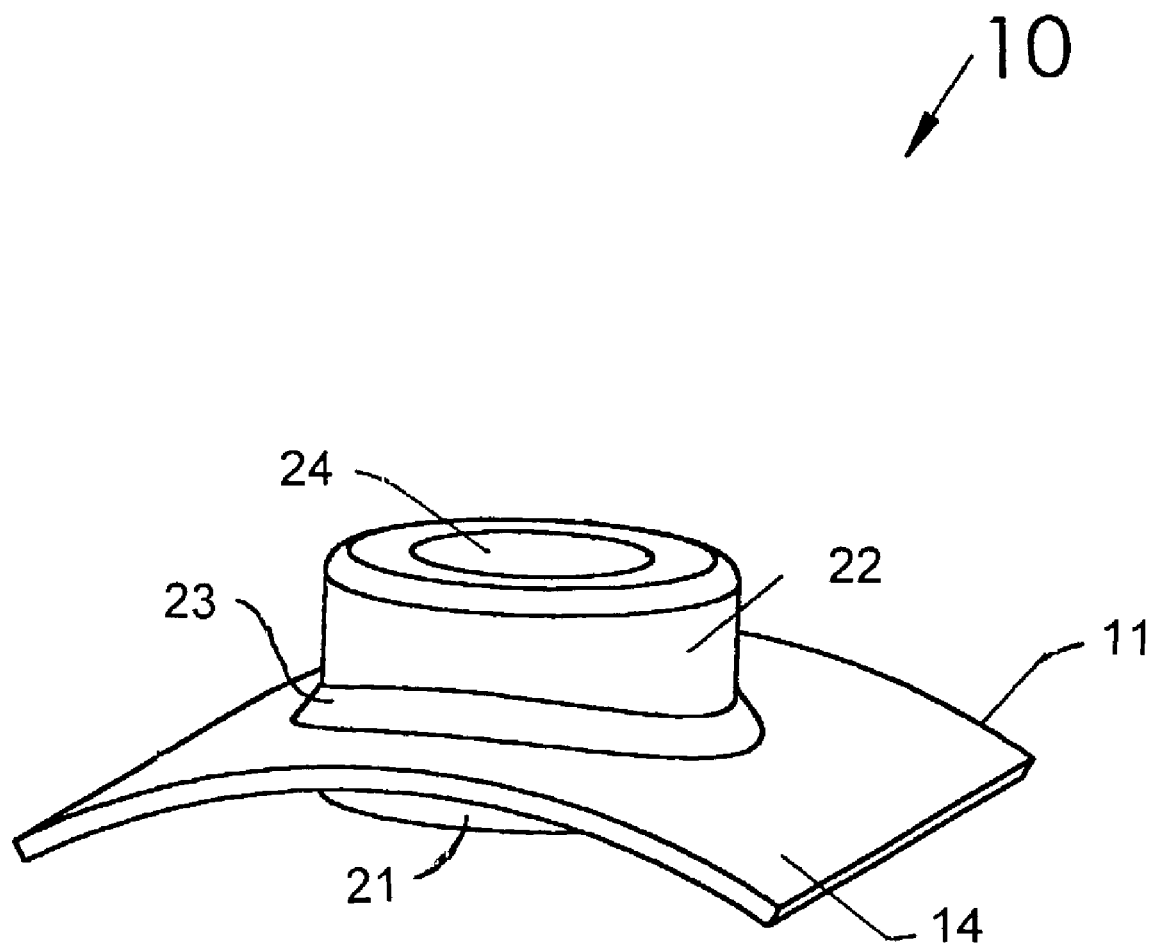
FIG. 2 is a perspective view from above of the mounting block of FIG. 1.

FIG. 2 is a perspective view from above of the mounting block of FIG. 1. In this Figure, the upper part 22 of tube 20 projects above the upper surface 14 of plate 11 and the tube is sealingly secured to the plate by weld 23. The top 24 of the tube is adapted to receive the device to be mounted, such as by being either internally or externally threaded to engage corresponding external or internal threads on the device.

In these Figures, the mounting block is shown as having a plate and tube construction, but this is not required: the only requisites of the mounting block are the lower surface conformed to the pipe at the location of use, the projection below that lower surface to extend into a hole in the pipe wall, and an aperture through the block from that projection to an upper surface of the block so that a device received in the mounting block is in fluid communication with the interior of the pipe by a continuous passageway through the block. However, the plate and tube construction shown is particularly convenient because it minimizes the weight and bulk of the mounting block, and this is especially attractive when the apparatus is used to mount a device on a pipe in a confined space (such as when the pipe lies close to a wall, frame, or other machinery) and/or when the pipe is subject to vibration (such as when the pipe is an exhaust pipe of an engine). Thus the plate and tube construction is particularly attractive when mounting a device on the exhaust pipe of a vehicle such as a bus or truck for exhaust monitoring or control, because the small size makes it easy to mount, and the light weight relative to a more substantial block minimizes the forces on the exhaust pipe as the pipe and the device mounted thereon vibrate as the engine operates and the vehicle moves.

Conformance of the base (the lower surface of the mounting block or its plate, depending on the design) with the outer surface of the pipe provides stability for the apparatus when mounted on the pipe and for the device received in the mounting block. The width and shape of the base may depend, in part, on the relative size of the pipe, the size or weight of the device, and the fastener for fastening the block onto the pipe. For example, larger bases may be used to accommodate larger or heavier devices to maintain sufficient stability.

In the plate and tube construction shown, the plate is sealingly attached to the substantially perpendicular tube. The tube may be attached to the plate by various means known in the art, such as casting, forging, or by a weld or solder joint, a heat-resistant adhesive, or the like. The tube may also be sealingly attached to the plate by coupling of an exteriorly threaded tube with nuts and washers disposed both above and below the plate. The tube may extend above the plate at a height sufficient to accommodate the physical structure necessary for mounting the selected device. Means for securing and mounting the device, such as internal or external threads and the like, may be provided on the surface of the tube. Optionally, the tube may include holes for securing the device by bolts perpendicular to the tube axis. Methods such as set screws may be used to secure the device in place.

Suitable materials for the mounting block of the invention will be those that are shapeable and dimensionally stable when shaped, such as metals and metal alloys, for example aluminum and its alloys, copper and its alloys such as brasses and bronzes, and ferrous alloys such as steels. When the mounting block is of the plate and tube construction shown, the materials of the plate and tube should be such as to readily enable the formation of a sealed joint between them (as, for example, by welding), so that the use of similar or identical materials is advantageous. A person of ordinary skill in the art, having regard to that skill and this disclosure, will have no difficulty in choosing suitable materials and designs for the mounting block of this invention.

Figure 3:
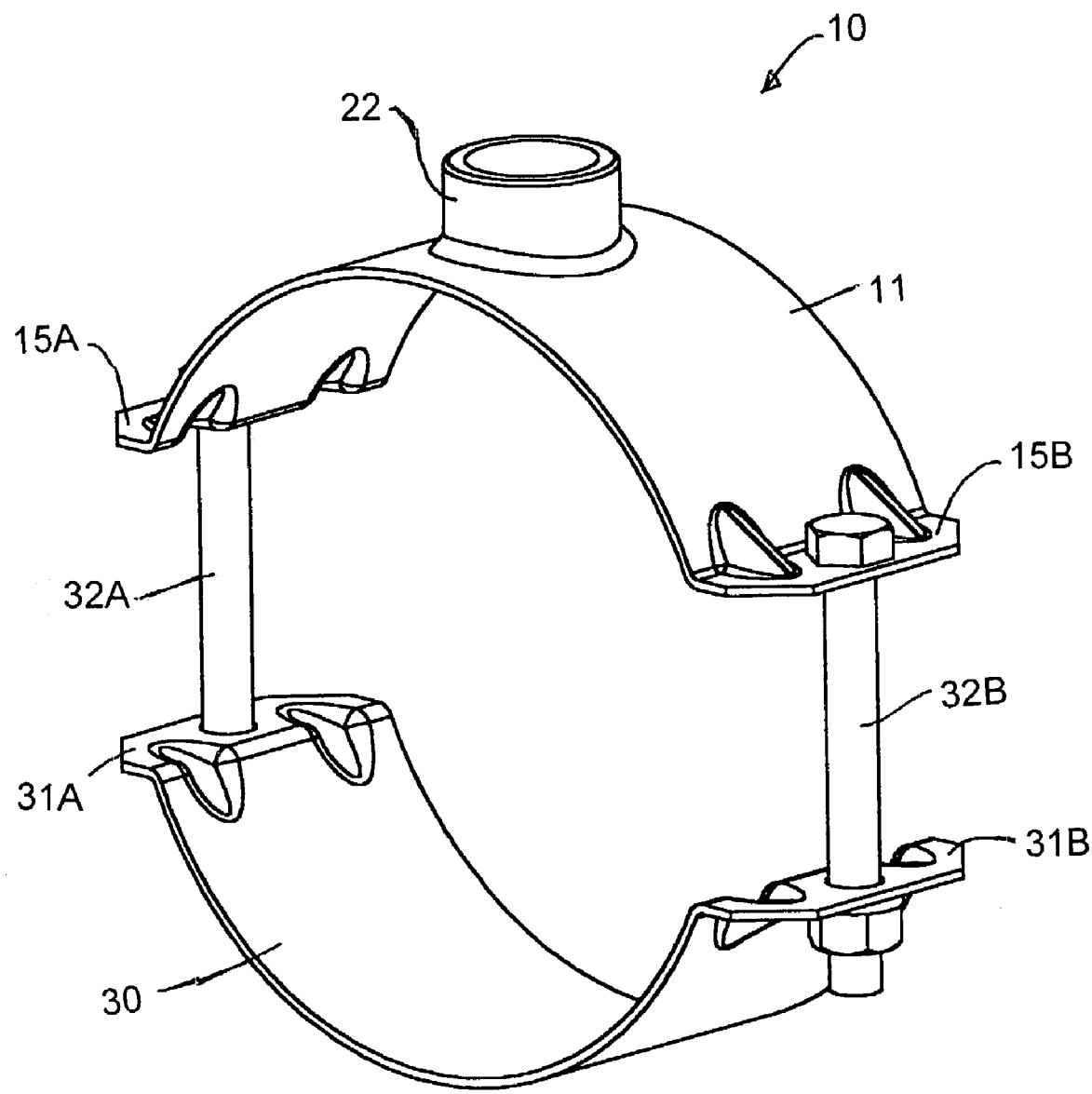
FIG. 3 is a perspective view of the mounting block and fastener of an apparatus of this invention.

FIG. 3 is a perspective view of a mounting block and fastener of the apparatus of this invention. In this embodiment, the mounting block is of the same plate and tube design as in the previous Figures, with the plate being extended so that, in addition to the part conformed to the outer surface of the pipe on which the apparatus is to be mounted, the plate ends in ears 15A and 15B at opposite ends of the plate, with the ears being shaped to that, when the apparatus is mounted on a pipe, they will lie in a plane generally perpendicular to a line running from the center of the pipe, through the tube of the mounting block. The fastener of the apparatus of this embodiment is a saddle clamp 30, having ears 31A and 31B, the saddle clamp very much resembling the plate 11 of the mounting block, and the saddle clamp being held to the mounting block by bolts 32A and 32B passing through ears 31A and 15A and 31B and 15B respectively.

Figure 4:
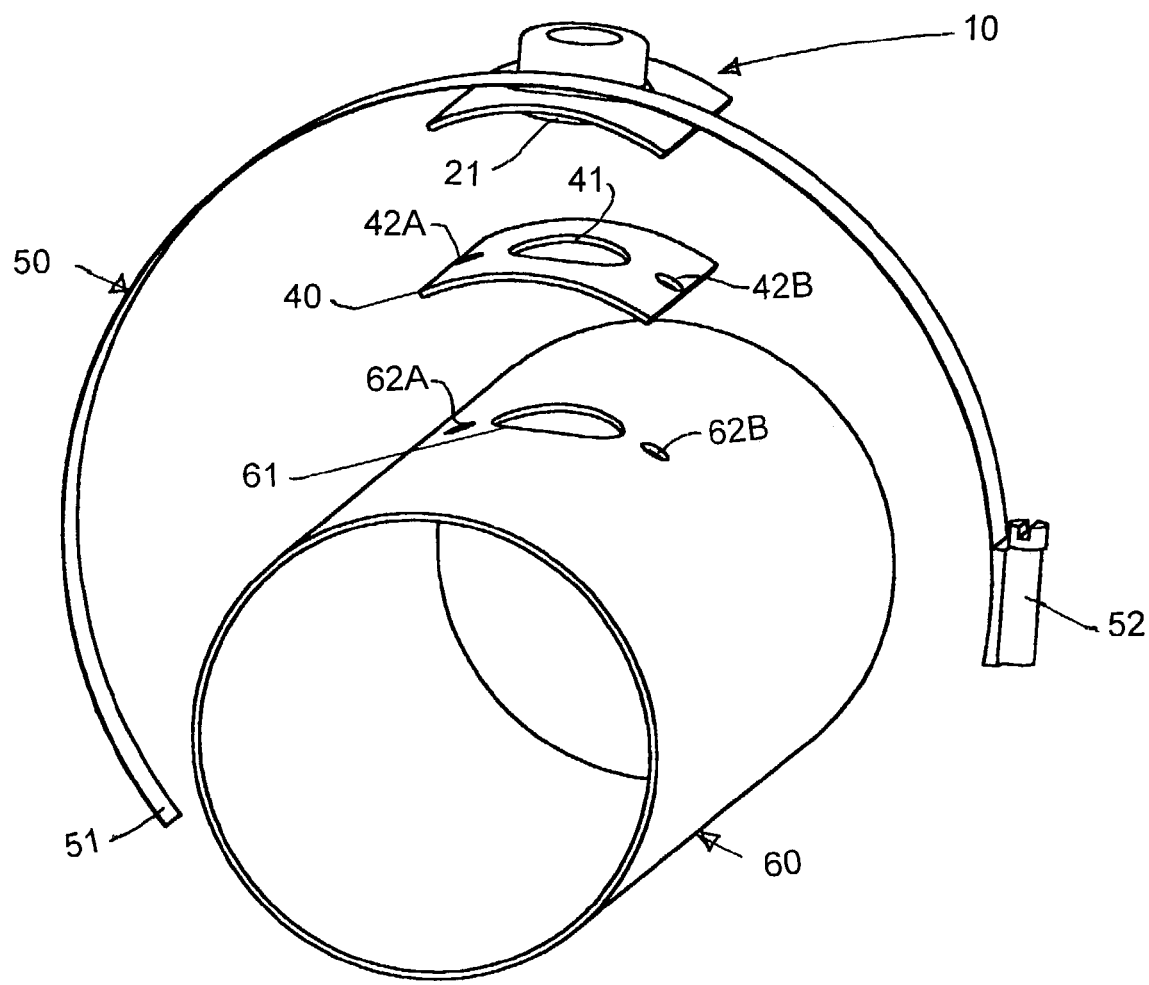
FIG. 4 is a perspective view showing an apparatus of this invention ready for mounting on a pipe.

FIG. 4 shows the complete apparatus of this invention ready for mounting on a pipe. In this embodiment, the mounting block 10 is of the same plate and tube design as in the previous Figures, and, as in FIGS. 1 and 2, lacking ears. The flat gasket shown generally at 40 has a central gasket hole defined by walls 41, sized to permit passage therethrough of the lower part 21 of the tube, and two locating peg holes defined by walls 42A and 42B, sized and positioned to permit passage therethrough of locating pegs extending downwardly from the plate 11. The fastener here is shown as a band clamp shown generally at 50 having a tongue 51 and a clamp body 52. A second band clamp would generally be placed over the plate on the other side of the upper part 22 of the tube, but is not shown here. The pipe shown generally at 60 on which the apparatus is to be mounted has a hole through its wall defined by side wall 61, sized to permit passage therethrough of the lower part 21 of the tube of the apparatus, and two locating peg holes defined by side walls 62A and 62B, sized and located to permit entry therein of locating pegs extending downwardly from the plate 11.

Examples of band clamps include hose clamps, wide band clamps, and couplings available from Nelson (Fleetguard Inc., Nashville, Tenn. 37214, USA), Breeze Industrial Products (3582 Tunnelton Road, Saltsburg, Pa. 15681, USA) and other suppliers. The bands are preferably releasably engageable and removable to permit ease of assembly and installation; though they may be fastened to the plate 11 of the mounting block, such as by screws or spot-welding, to maintain them together with the mounting block when the apparatus is not mounted to a pipe. The bands can be made from various materials known in the art, typically ferrous alloys such as steel and the like.

The gasket 40 is conformable to the outer surface of the pipe and provides a seal between the outer surface of the pipe and the mounting block. In its simplest form, where there are no locating pegs or the gasket lies outside of the locating pegs as well as of the lower part 12 of the tube, the gasket may be an annular (not necessarily circular) sealing ring; but more usually it will be a flat gasket having a size comparable to that of the conformed lower surface of the mounting block (i.e. completely separating the mounting block from the pipe) with apertures cut therein for the passage therethrough of the lower part of the tube and any locating pegs. It may be made of any suitable material having sealing capability in the intended application; and thus may be of rubber or other polymeric material or, in a high-temperature or corrosive environment, may be of an optionally filled high-temperature polymer, such as a polyamide or polyimide, or of glass fiber, mica, deformable metal or metal foil or laminate, or the like. If desired, the gasket may be provided with an outer retainer ring to prevent excessive displacement of the gasket material in use, or such a ring can be provided as a part of the lower surface of the mounting block. A person of ordinary skill in the art will have no difficulty in choosing a suitable material and design for the gasket.

It will be apparent to a person of ordinary skill in the art that, for a particular pipe and a particular device to be mounted thereon, an appropriate apparatus will be chosen (i.e., a mounting block capable of receiving the device, a fastener capable of securely mounting the apparatus and device to the pipe, and a gasket suited to the mounting block). Holes of appropriate size and number (i.e., at least a hole for the passage therethrough of the projection of the mounting block below its lower surface—the lower part of the tube in the Figures, and optionally an additional hole or holes or indentations, if the pipe wall is sufficiently thick—for the passage therethrough or therein of any locating pegs on the mounting block) will then be cut in the pipe wall at the chosen location. The mounting block is then engaged on the gasket and mounted onto the pipe so that the projection of the mounting block below its lower surface passes through the gasket and into the hole in the pipe wall, and the apparatus is then secured to the pipe by the fastener. The device to be mounted on the pipe may then be received onto the mounting block.

Figure 5:
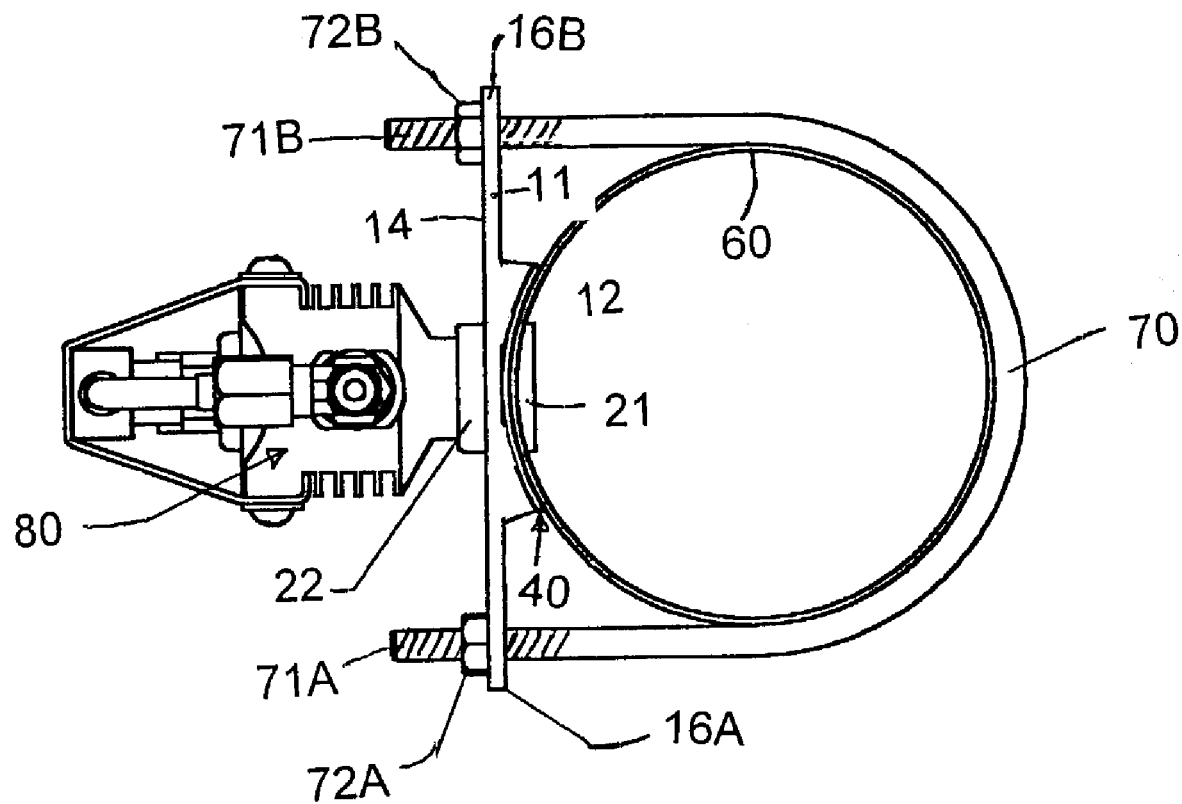
FIG. 5 is a longitudinal view down a pipe showing an apparatus of this invention mounted on a pipe with a fluid injector received therein.

FIG. 5 is a longitudinal view down a section of pipe with the apparatus of this invention mounted thereon and a device received on the apparatus so that the device is mounted onto the pipe. Here the mounting block, while still resembling the plate and tube construction of the previous Figures, shows a different construction adapted to the fastener being used, here a U-bolt. The plate 11, while still having a lower surface 12 that is conformed to the outer surface of the pipe on which it is to be mounted, has a flat upper surface 14 which extends outward to ears 16A and 16B. A U-bolt 70 extends around the pipe 60, with its ends 71A and 72A passing through holes in the ears 16A and 16B and nuts 72A and 72B screwed onto these ends complete the fastening arrangement. In this Figure, the device 80 is shown as a fluid injector in a fluid-cooled injector mount (of the type described in Ser. No. 10/407,140 referred to previously).

Other fasteners than the saddle clamp of FIG. 3, the band clamp of FIG. 4, and the U-bolt of FIG. 5 may of course be used, and a person of ordinary skill in the art will have no difficulty in choosing a suitable fastener for the apparatus of this invention knowing the pipe and the device to be mounted thereto.

Figure 6:
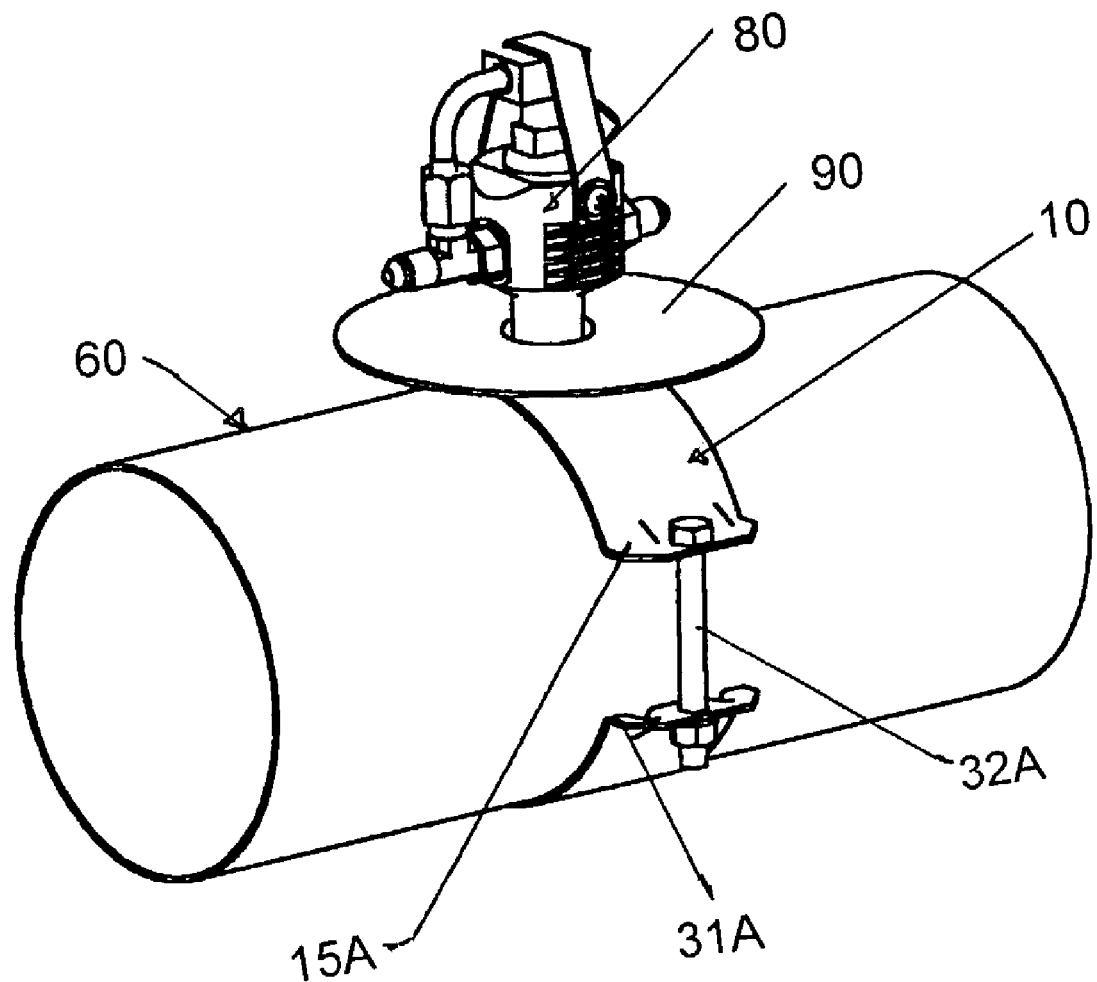
FIG. 6 is a perspective view of an apparatus of this invention mounted on a pipe with a heat shield shielding a fluid injector received therein.

FIG. 6 is a perspective view of an apparatus of this invention mounted on a pipe and with a device received therein so that the device is mounted on the pipe. In this Figure, the apparatus is that shown in FIG. 3, where the fastener is a saddle clamp, the device 80 is shown as a fluid injector in a fluid-cooled injector mount (of the type described in Ser. No. 10/407,140, and a first shield 90 is retained between the mounting block and the device, shielding the device from the pipe. A person of ordinary skill in the art will readily understand that this arrangement is particularly suitable where the pipe is carrying a high temperature fluid, such as where the pipe is the exhaust pipe of an internal combustion engine, and where the device or parts thereof are temperature sensitive, such as where the device is an injector for injection of an $NO_x$ reducing fluid into the exhaust as it flow through the pipe.

The first shield may be constructed using materials and designs to accommodate the desired use of the apparatus and device. In this embodiment, the shield is a heat shield and comprises a metal plate made, for example, from commercially available aluminum or aluminum alloy, or a steel such as mild steel or a stainless steel; or it may be made from a multi-layer material or laminate such as metal-reinforced silicate fiber. The shield may also be treated such as by anodization or polishing to enhance its performance. The first shield will be sized appropriately to protect the device, such as having a thickness of about 1 mm and a diameter of about 50–200 mm, e.g. about 50–100 mm. As a heat shield, it reduces the radiative heat transferred from the local environment, such as from an exhaust pipe to which the device is mounted, to the device. The first shield may be secured to the apparatus in any suitable way, such as welding, fastening with bolts, or interspersing the heat shield between the device and the mounting block so that it is retained between them.

Figure 7:
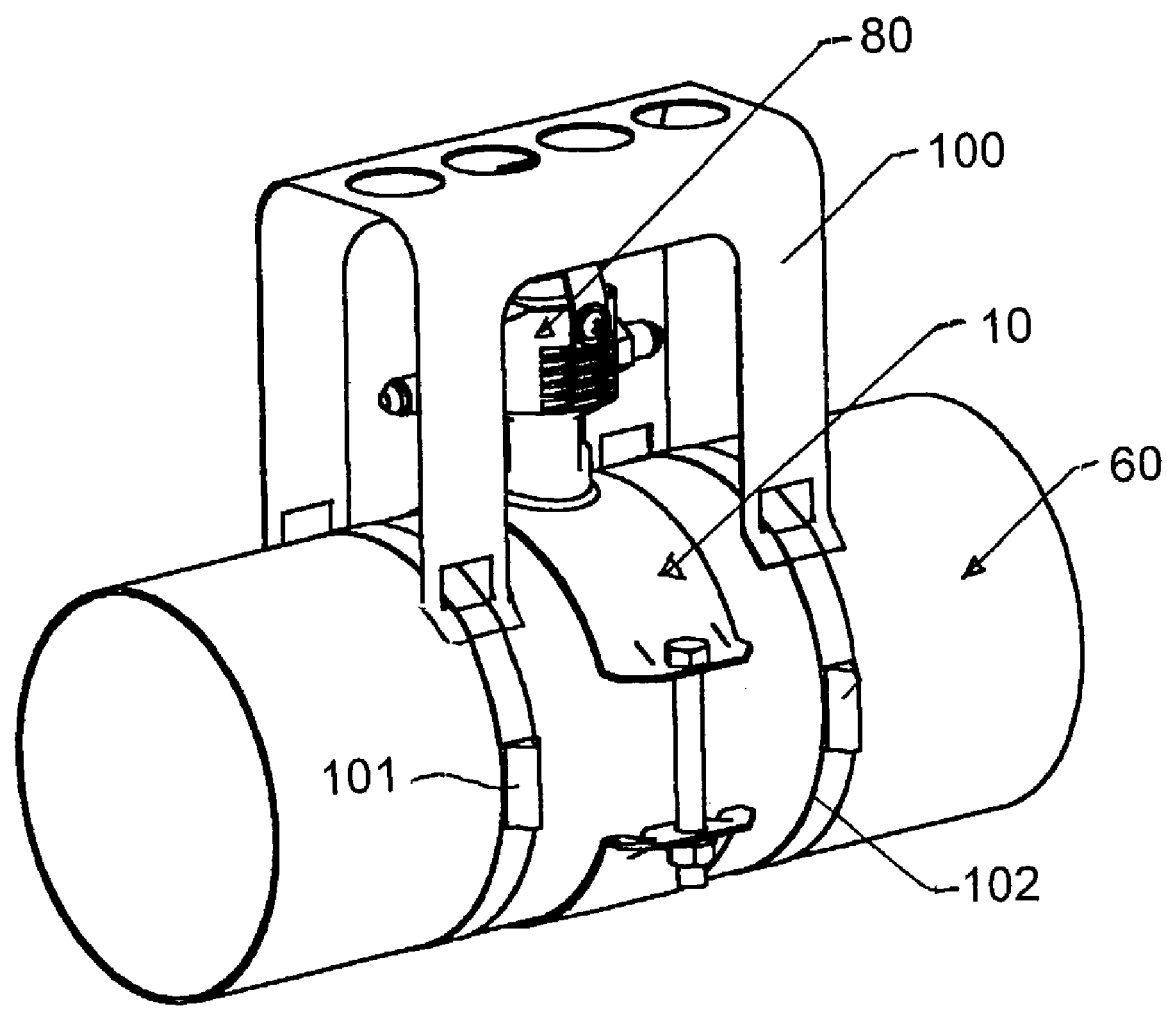
FIG. 7 is a perspective view of the apparatus and fluid injector of FIG. 6, without the heat shield, but with a second shield shielding the device from the external environment.
Figure 8:
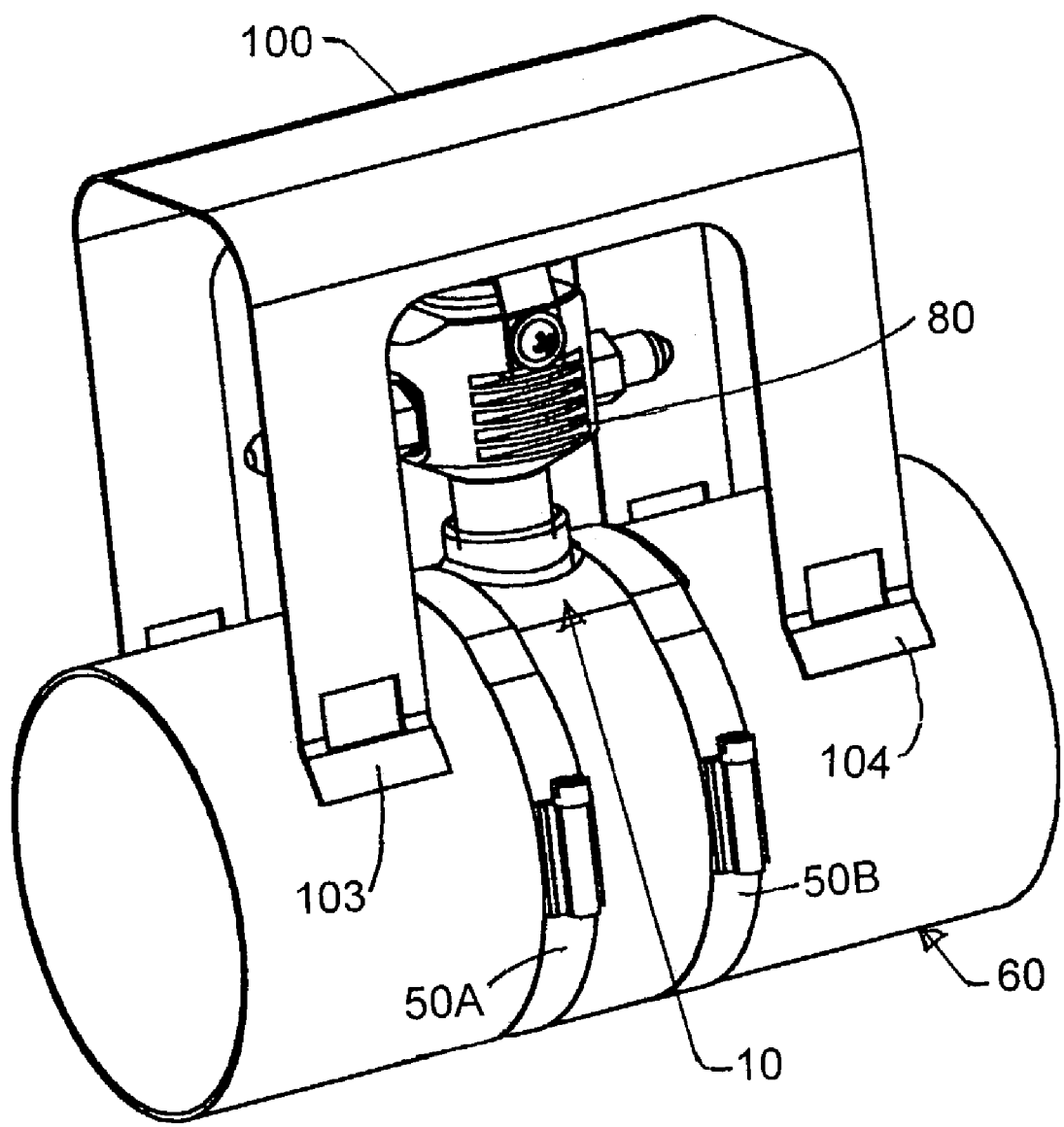
FIG. 8 is a perspective view of an apparatus of this invention mounted on a pipe with a fluid injector received therein and a second shield shielding the device from the external environment.

FIGS. 7 and 8 are perspective views showing an apparatus of this invention mounting a device on a pipe, with a second shield adapted to protect the device. In each Figure, the mounting block of the apparatus is as seen in previous Figures and the device is shown as a fluid injector in a fluid-cooled injector mount.

The second shield 100 is designed to protect the mounted device from the immediate environment. The shield may be constructed using various designs as suitable to accommodate the desired application of the apparatus; for example, for vehicular applications, the shield may operate as a protective shield against particles and road hazards. The shield may be secured to the mounting apparatus or to the pipe in any suitable way, such as by welding, bolts, clamps, or adhesives, and FIGS. 7 and 8 show two such ways. The second shield may be made of any material suitable for the intended use and environment, and will typically be made of a metal or metal alloy such as steel.

In FIG. 7, the apparatus is that of FIG. 3, using a saddle clamp as the fastener. The second shield 100 is secured to the pipe 60 by band clamps 101 and 102 passing through appropriate holes in the shield, an arrangement that permits ready removal of the shield when desired, such as when the device is to be removed and re-installed. Here, though the second shield is shown as relatively open in structure, it may be of more closed structure because it is easily removable.

In FIG. 8, the apparatus 10 uses band clamps 50A and 50B as the fastener, as discussed for FIG. 4, and the second shield 100 is shown secured to the pipe directly, for example by welds attaching the ears 103 and 104 (and the other two ears hidden from view) of the shield to the pipe wall. Here the second shield is shown as relatively open in structure, and this will be necessary if access to the apparatus and device is required because the shield is not readily removable.

Although the invention has been described in this application with reference to specific and preferred embodiment, which are exemplary of the invention and are not intended to limit the invention, a person of ordinary skill in the art will be able to conceive modifications and variations on these specific embodiments. All such modifications are included within the intended scope of the invention as represented by the claims and their equivalents.

What is claimed is:

1. An apparatus for mounting a device to a pipe, the pipe having a curved wall having an outer surface and a hole through the pipe wall at a position in the pipe wall, the apparatus comprising:
    (a) a gasket conformable to the outer surface of the pipe wall adjacent the pipe wall hole, and having a gasket hole complementary to the pipe wall hole,
    (b) a mounting block,
        having at least a part of one surface conformed to the outer surface of the pipe wall adjacent the pipe wall hole,
        having integral therewith on that at least a part of the one surface a projection shaped to engage the pipe wall hole such that the mounting block can be placed on the pipe over the gasket with the projection engaging the pipe wall hole, and
        having an aperture extending through the mounting block and projection, the end of the aperture furthest from the projection being adapted to receive the device,
        such that, when the device is received onto the mounting block and the mounting block is placed on the pipe over the gasket with the projection engaging the hole in the pipe wall, there is a continuous open passage between the interior of the pipe and the device; the mounting block further comprises integral therewith on that at least a part of the one surface a locating peg engageable with a second hole in the pipe wall and
    (c) a fastener for securing the mounting block onto the pipe over the gasket such that the projection engages the pipe wall hole.

2. The apparatus of claim 1 further comprising at least two locating pegs.

* * * * *